(12) United States Patent
Reuling et al.

(10) Patent No.: US 11,026,436 B2
(45) Date of Patent: Jun. 8, 2021

(54) PRODUCTION LINE AND METHOD FOR IN-LINE PROCESSING OF FOOD PRODUCTS

(71) Applicant: MAREL TOWNSEND FURTHER PROCESSING B.V., Boxmeer (NL)

(72) Inventors: Sanne Reuling, Cuijk (NL); Johannes Martinus Meulendijks, Deurne (NL); Johannes Marinus Quirinus Kools, Oudenbosch (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 696 days.

(21) Appl. No.: 14/905,927

(22) PCT Filed: Jul. 11, 2014

(86) PCT No.: PCT/NL2014/050473
§ 371 (c)(1),
(2) Date: Jan. 18, 2016

(87) PCT Pub. No.: WO2015/009143
PCT Pub. Date: Jan. 22, 2015

(65) Prior Publication Data
US 2016/0150799 A1    Jun. 2, 2016

(30) Foreign Application Priority Data
Jul. 19, 2013  (NL) .................................. 2011200

(51) Int. Cl.
*A47J 37/00*   (2006.01)
*A23B 4/023*   (2006.01)
(Continued)

(52) U.S. Cl.
CPC ............. *A23B 4/023* (2013.01); *A23B 4/30* (2013.01); *A23B 4/305* (2013.01); *A23L 13/62* (2016.08); *A23L 13/65* (2016.08)

(58) Field of Classification Search
CPC . A23B 4/30; A23B 4/305; A23L 13/62; A23L 13/65; A23L 13/60; A23V 2200/224; A23V 2200/10
(Continued)

(56) References Cited

U.S. PATENT DOCUMENTS 4,532,858 A    8/1985  Hershfeld
4,957,756 A *  9/1990  Olander ................... A23B 4/01
                                                  426/243

(Continued)

FOREIGN PATENT DOCUMENTS

DE        10228172 A1    1/2004
EP         1880611 A1    1/2008
(Continued)

OTHER PUBLICATIONS

JP2003-524375A—English_Translation.
(Continued)

*Primary Examiner* — Reginald Alexander
(74) *Attorney, Agent, or Firm* — Workman Nydegger

(57) ABSTRACT

The invention relates to a production line for in-line processing of food products, comprising a food transport path that successively leads through: a brine unit; a liquid smoke unit; and a transit oven. The invention also relates to a method for in-line processing of food products, comprising the successive process step: moisturising the food products with a brine; moisturising the food products with a liquid smoke; and heating the food products.

8 Claims, 2 Drawing Sheets

(51) Int. Cl.
*A23L 13/60* (2016.01)
*A23B 4/30* (2006.01)

(58) Field of Classification Search
USPC .................................. 99/535, 534, 516, 484
See application file for complete search history.

(56) References Cited

U.S. PATENT DOCUMENTS

| | | | | |
|---|---|---|---|---|
| 5,997,925 | A * | 12/1999 | Wilson | A23B 4/023 426/332 |
| 6,245,369 | B1 * | 6/2001 | Kobussen | A22C 11/0254 425/140 |
| 6,713,107 | B2 * | 3/2004 | Shefet | A21B 1/28 126/21 A |
| 7,357,953 | B1 * | 4/2008 | Van Den Dungen | A22C 11/001 426/465 |
| 2008/0145495 | A1 * | 6/2008 | Burroughs | A23P 30/20 426/277 |
| 2008/0181987 | A1 * | 7/2008 | Lusby | A23L 13/03 426/62 |
| 2008/0317915 | A1 | 12/2008 | Hu et al. | |
| 2010/0015304 | A1 * | 1/2010 | Sauvageau | A23B 7/015 426/248 |
| 2015/0230514 | A1 * | 8/2015 | Bontjer | A22C 11/001 426/277 |

FOREIGN PATENT DOCUMENTS

| | | |
|---|---|---|
| JP | 2003524375 A | 8/2003 |
| JP | 2009507487 A | 2/2009 |

OTHER PUBLICATIONS

JP2009-507487A—English_Translation.
Japanese Office Action, Japanese Patent Appl. No. 2016-527964, dated Jun. 4, 2018, 4 pages.
Japanese Office Action, Japanese Patent Appl. No. 2016-527964, dated Jun. 4, 2018, 3 pages—English Translation.
Kevin S. Weadock et al: "Physical crosslinking of collagen fibers: Comparison of ultraviolet irradiation and dehydrothermal treatment". Journal of Biomedical Materials Research, vol. 29, No. 11, Nov. 1, 1995 (Nov. 1, 1995), pp. 1373-1379, XP055108748, ISSN: 0021-9304, DOI: 10.1002/jbm.820291108 the whole document.

* cited by examiner

PRODUCTION LINE AND METHOD FOR IN-LINE PROCESSING OF FOOD PRODUCTS

BACKGROUND OF THE INVENTION

The invention relates to a production line for in-line processing of food products, for instance sausages, wherein the food products are brined, (surface) dried, heated and smoke treated. The invention also relates to a method for in-line processing of food products including brining, drying, heating and smoking the food products.

Industrial production of food products, and more specific food products manufactured out of a food dough—like for instance sausages or hamburgers made out of meat dough or a vegetable dough—can for high volumes efficiently be realised when using in-line processing equipment. The food products are often transported in between the process stations with conveyors, like belt conveyors or mesh conveyors. In between different transporters like for instance conveyors or other transporters like gutters transfer units may be applied. In this respect in-line processing is to be understood as the opposite of batch processing; in line processing is performed by leading the products to be processed in a flow, normally a continuous flow or a flow with intermediate storage positions, though a series of production stations. As for the processing of the type of food products the present invention is directed to standard processing steps are brining, drying, heating and smoking. With brining, (treating the outside of the products with a salt solution containing e.g. DKP and/or $MgSO_4$) the non-stable outside (skin) of the food products is stabilised. The choice for a specific type of salt (combination) as well as the concentration which is used determine for instance the temperatures and humidity that may be applied in the oven. After such pre-stabilised brined food product these products are forwarded to an oven for drying and hardening the food products. A liquid smoke normally comprises carbonyls which provide cross linking, colour and taste to the food products (the liquid smoke may e.g. contain smoke flavour and polysorbate 80 and has and with a typical pH of 2,5-3,5. The present production technology is adequate but it is not simple to control the quality of the processed food products due to variations in circumstances (like external temperature, humidity, ingredient variations and so on) that are difficult to master.

The object of the invention is to provide a production line for in-line processing of food products, as well as a method for in-line processing of food products, that enables better control of the quality of the processed food products than the prior art solutions. A further object of the invention is to further enhance the efficiency of in-line processing of food products.

SUMMARY OF THE INVENTION

The invention provides a production line for in-line processing of food products, comprising a food transport path that successively leads through: A) a brine unit for feeding a brine solution to the food products; B) a liquid smoke unit for feeding a liquid smoke to the brined food products; and C) a transit oven for drying and heating the brined and smoke treated food products. In this production line for in-line processing of food products the liquid smoke unit is different from the prior art—placed before the transit oven wherein the brined and smoke treated food products are dried and heated.

This implies that the food products are treated with liquid smoke before their (first) entrance in the transit oven, so the food products are not thermally pre-dried before the smoking process. Optionally a mechanical drying step can be fitted in (like for instance blowing of superfluous liquid with one or more air knifes). The liquid smoke is added to—among others—support cross linking of the skin, to change the colour of the food products and/or to influence the flavour of the food products. Different from the prior art the present invention provides the insight that penetration of liquid smoke in the skin (casing) of the food products is a diffusion reaction that is typically governed by the concentration of the liquid smoke in a liquid smoke solution whereas pre-drying the food product is not required. Preparation of the food product in the oven before the treatment with liquid smoke is thus—different from the prior art teaching not necessary. An important advantage of this process sequence is that the liquid smoke is to be applied at relative low temperature circumstances (products and transporting means are not heated yet at the moment of applying the liquid smoke) thus cooling of the liquid smoke is not necessary as it is according the prior art while liquid smoke is seriously temperature sensitive (at temperatures above approximately 40° C. it is instable) and at the same time the liquid smoke stays more stable at the lower temperature. In this respect it is also of importance that (higher) temperature of the food products and/or higher temperatures of transporters (like conveyor) according the prior art can have a negative (enhancing) influence on the temperature of the liquid smoke. In the present invention such disturbing influences on the optimum liquid smoke temperature will not occur. An advantage of lower temperature for applying the liquid smoke is also that less evaporation of liquid smoke occurs and also the rate of smoke evaporation is more controlled so staining due to smoke vapour contacting the food product can be avoided. As the time required for smoking the food products in a liquid smoke unit is only limited (less than 4, less than 3 or even less than 2 seconds) the total processing time of the food products according the invention can be limited when compared to the comparable prior art processing (traditionally comprising pre-drying in an oven, applying liquid smoke and post drying in an oven). Yet a further advantage is that the invention results in higher production yields.

The brine unit, and/or the liquid smoke unit may optionally be provided with a controlled climate cabinet. Also for the oven climate control means may be provided to monitor and steer the oven climate. For a complete process control it may be important to have control on environmental circumstance that could influence the outcome of the food processing according the invention.

In an embodiment the transport path includes plural connecting food transport conveyors of which a food transport conveyor that leads through the liquid smoke unit is separate from a food transport conveyor that leads through the transit oven. As an alternative for transport conveyors also other transporters may be used like for instance a chute, which may be especially beneficial for shorter transport tracks. By separating the transport conveyors of the liquid smoke unit and the oven the liquid smoke that is carried along with a conveyor into the oven can be limited. The advantage not only being a reduction of liquid smoke consumption but also less (negative) influencing the oven conditions and the oven energy consumption.

In a further embodiment the transit oven is chosen from the group consisting of linear transit ovens and spiral transit ovens. These types of ovens are well suited for in-line food processing and enable flexible heat treatment. Also these type of ovens enable a comprehensive oven climate control air temperature, air humidity and air velocity) and a variation in heating conditions during the passage of the oven. Thus enabling a flexible heat treatment.

The liquid smoke unit is preferably provided with a liquid smoke dispenser which may be designed as a shower, a drench system, a bath, an atomizer or any other type of dispenser dependent on the specific circumstances (type of food product, type of liquid smoke, smoke time, and so on). As an alternative the brine unit and the liquid smoke unit may be arranged in a combined brine/liquid smoke unit wherein both brine and liquid smoke are applied to the food products. A combination of liquid smoke and brine also provides additional possibilities for food product specifications to be realised (e.g. in colour, texture and/or bite).

Additionally preceding the brine unit the production line may comprise a co-extrusion unit for extruding a food dough with a coating that comprises collagen, alginate and/or hybrid coatings. Especially co-extruded food products with a collagen and/or alginate coating are suited to be processed on a production line according the invention as these food products are made in-line in (high) volume and typically require brining, dying, heating and smoking. The collagen and/or alginate coating (skin) usually requires brining for stabilising the coating. The assumption was that the collagen and/or alginate coating also required a pre-drying in an oven before liquid smoke could be successfully applied. However the present invention now shows that before entering the oven these types of products can successfully be smoke treated with liquid smoke without a preparatory pre-heating (drying) of the skin A further improvement for processing co-extruded food products with a collagen and/or alginate coating is to include a UV-source in the production line preceding the oven. The advantage of radiating the food products with UV before they enter the oven is that this provides an additional cross linking of skin which enables to use higher oven temperatures and/or higher humidity in the oven which results in more production flexibility and which thus also enable shorter processing times.

The invention also provides a method for in-line processing of food products, comprising the successive process step:

i) moisturising a flow of food products with a brine;

ii) moisturising the brined flow of food products with a liquid smoke; and iii) drying and heating the smoke treated and brined flow of food products by transferring them through an oven. With such method the advantages as previously listed in relation to the production line according the invention can be realised and are here incorporated by reference. Especially the enhanced efficiency of the in-line processing of food products and the enhanced production flexibility resulting in more freedom in food products to be realised are important in practise. The freedom of processing results in the ability to control for instance the skin characteristics of the processed food products. Examples of such skin characteristics to be controlled are, among others, denaturation, colour, roundness, smoke distribution, smoke absorption, cross linking, texture and so on.

The method according the invention enables the smoke treated and brined food products to be heated in the oven to a surface temperature of 50-200° C., preferably to a surface temperature of at least 80° C. These temperatures are higher than the prior art oven temperatures. Especially positive results have been realised with oven temperatures of [80-140]° C. The enhanced flexibility in heat treatment enables for instance fully cooking the food products in the oven. A further advantage is that it provides additional flexibility in colour formation on the food products. Colour formation is (at least partially) a result of an "Maillard reaction". The liquid smoke absorbed by the food products, as well as any liquid smoke clinging to the food products, as well as the temperature are the main drivers of the Maillard colouring reaction. By using higher oven temperatures (over 70° C., over 80° C. or over 90° C.) faster and more intense colouring takes places.

As compared to the prior art the velocity of the gas flows in the oven is relative high; a velocity of 3,5-6,5 m/s (preferably 4-6,5 m/s or even 5-6,5 m/s) enables an efficient heat and moisture transfer in the oven. With gas velocity the relative speed to the food products is indicated; this can be a horizontal, vertical or an gas flow with an intermediate direction.

As for the dew point in the oven preferably a choice is made for a dew point of the gas in the oven of 25-98° C. The dew point is the temperature below which the water vapour in a volume of humid air at a given constant barometric pressure will condense into liquid water at the same rate at which it evaporates. In combination with the higher oven temperatures as elucidated above such dew point results in a higher moisture level but still enabling efficient drying of the food products but without the danger of dehydration and/or gelation (melting) of a specific type of coating (e.g. collagen). A good control of oven conditions make it possible to define the meat texture characteristics of the processed food products.

Before process step i) the food products may be co-extruded as a food dough with a coating of collagen and/or alginate. Especially during the processing of this type of products the advantages as listed above occur. As a food dough a meat dough or a vegetable dough may be applied. The extruded food product may be a food string which is normally subdivided in singulated (separated) products before the food products enter the oven. The separation can be executed also before smoking or before brining or on any other location. A well know way of separating a food string in individual product in this type of industry is using a separation wheel (crimper wheel) or pinchers. If food products are separated during the processing according the invention the location as well as the exact process for separating is free of choice dependent on various circumstances (like food material choices, process specifications and so on).

A typical duration of processing step ii) wherein the brined flow of food products are moistured with a liquid smoke may be 1-3 seconds (preferably [1,5-2,5] s. or [1,5-2] s.). Even this sort time of smoking provides a sufficient level of cross linking of the skin to enable further processing according the invention.

The processing steps i) and ii) may as an alternative also be combined by moisturising the flow of food products in a single step with a combined brine and liquid smoke fluid. As also listed before the combined brining and smoking enables additional possibilities in relation to the specifications of the processed food products (as mentioned e.g. in the colour, the texture and/or the bite of the processed food products).

The invention enables a high level of the liquid smoke re-circulation of the liquid smoke use in processing step ii) of even more than 95%, more than 97%, or even more than 98%. A high level of liquid smoke re-circulation limits the liquid smoke consumption and helps thus to process the food products cost efficient. After smoking the food products they may be transferred along a linear or spiral path through the oven.

This method provides flexibility in the profile and level(s) of heating the food products. The method could be used for the production of fully dried and cooked food products as well as semi-finished food products that could for instance be cooked after packaging ("cook in the pack").

BRIEF DESCRIPTION OF THE FIGURES

The invention is further elucidated on the basis of the non-limitative exemplary embodiment shown in the following figures. Herein shows.

DETAILED DESCRIPTION OF THE PREFERRED EMBODIMENT

Figure 1:
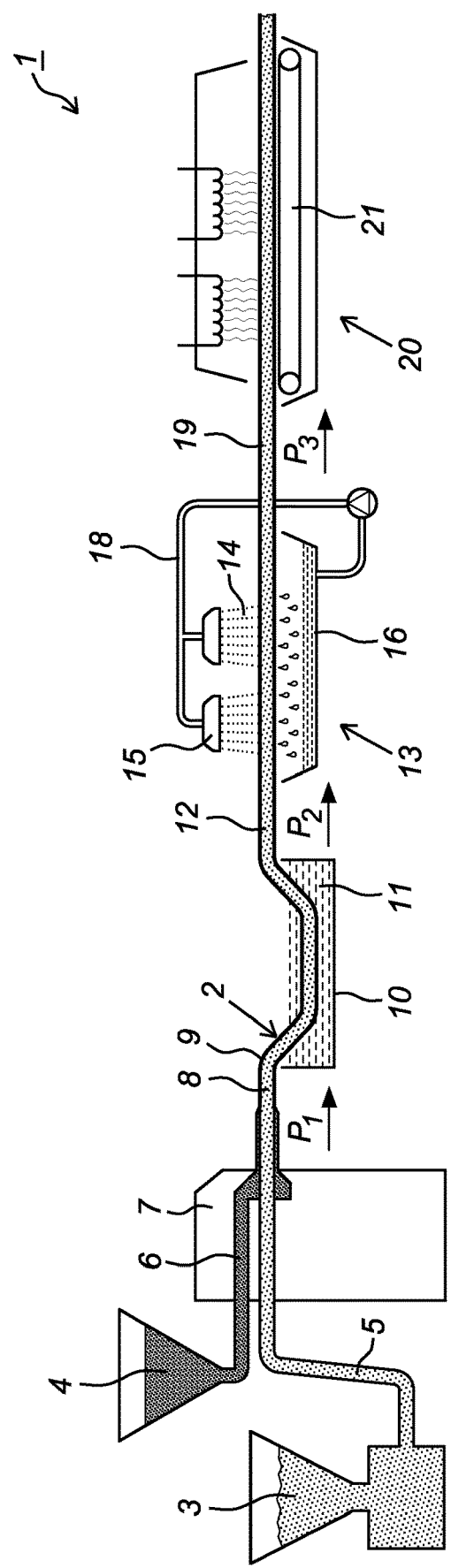
FIG. 1 a schematic view on a production line for in-line processing of food products according the present invention.

FIG. 1 shows a production line 1 for in-line processing of a food string 2. A food dough 3 and a casing material 4 are fed by different feed lines 5, 6 to a co-extruder 7.

The co-extruder 7 produces the food string 2 having a core 8 of food dough that is coated with a casing 9. The casing 9 is not stabile directly after leaving the co-extruder 7 (see arrow $P_1$), thus the food string 2 is subsequently brined in a brining bath 10 containing a salt solution 11.

The brined food string 12 is then fed (see arrow $P_2$) to a smoker 13 wherein a liquid smoke solution 14 is sprinkled from shower heads 15 on the brined food string 12. In the smoker 13 the surplus of liquid smoke 14 is caught in a basin 16 to be reused after re-circulation 18. When leaving the smoker 13 the now brined and smoke treated food string 19 is thereupon fed (see arrow $P_3$) to a linear oven 20. The brined and smoke treated food string 19 is moved via a conveyor 21 though the oven 20.

Figure 2:
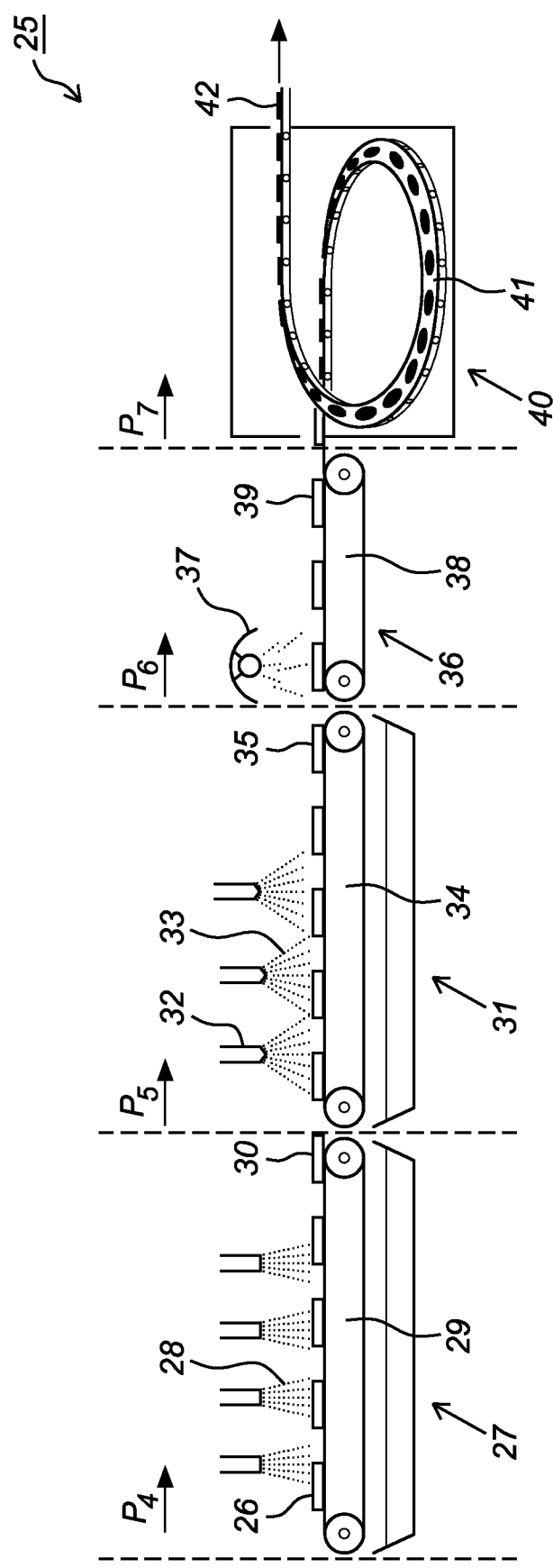
FIG. 2 a schematic view on an alternative embodiment of a production line for in-line processing of food products according the present invention.

FIG. 2 shows an alternative embodiment of a production line 25 for in-line processing of individualised food products 26 which are in a first processing step fed (see arrow $P_4$) to a brine station 27 wherein a salt solution 28 is poured onto the individualised food products 26 that are carried through the brine station 27 on a conveyor 29.

After leaving the brine station 27 the now brined individualised food products 30 are fed (see arrow $P_5$) to a smoker 31 wherein nozzles 32 dispose a liquid smoke 33 onto the brined individualised food products 30. The brined individualised food products 30 are carried along the nozzles 32 on a second conveyor 34 that is following the conveyor 29 of the brine station 27 so to minimise the quantity of brine 28 that is dragged along form the brine station 27 to the smoker 31.

After leaving the smoker 31 the then brined and smoke treated individualised food products 35 are fed (see arrow $P_6$) to an UV-radiator 36. In the UV-radiator 36 a UV-source 37 is working on the brined and smoke treated individualised food products 35 to further stimulate the cross linking of the external part of the brined and smoke treated individualised food products 35. Also in the UV-radiator 36 the food products 35 are carried along with a separate conveyor 38.

After leaving the UV-radiator 36 the then brined, smoke treated and UV radiated individualised food products 39 are fed (see arrow $P_7$) to a transit oven 40 wherein a spiral conveyor 41 transports the food products 39 along the oven. Finally the then brined, smoke treated, UV-radiated and heated individualised food products 42 leave the oven 40 (see arrow $P_7$).

The technical features of the invention as illustrated here in the various embodiments of the method and device according the invention are not only disclosed in connection with the other technical features as shown in these examples but are also disclosed individually. Thus combinations of all the individual technical features disclosed with any other individual technical feature disclosed in this application is also to be understood as being disclosed here.

What is claimed:

1. A production line for in-line processing of extruded food products, comprising a food transport path that successively leads through:
    A) a brine unit for feeding a brine solution to a collagen, alginate and/or hybrid coating of the extruded food products and subsequently a liquid smoke unit for feeding a liquid smoke to the brined food products, or
    A2) a combined brine/liquid smoke unit for applying both brine and liquid smoke to the food products, in order to stabilize the collagen, alginate and/or hybrid coating; and subsequently
    B) a transit oven for drying and heating the brined and smoke treated food products;
    wherein the transport path leads from the brine unit to the liquid smoke or through the combined brine/liquid smoke unit, without passing through a drying unit or an oven; and
    wherein preceding the brine unit or the combined brine/liquid smoke unit, the production line comprises a co-extrusion unit for extruding food products with the collagen, alginate and/or hybrid coating; and
    wherein the brine unit and the liquid smoke unit, or the combined brine/liquid smoke unit, are provided with a climate controlled cabinet.

2. The production line according to claim 1, wherein the food transport path includes plural connecting food transport conveyors of which a food transport conveyor that leads through the liquid smoke unit is separate from a food transport conveyor that leads through the transit oven.

3. The production line according to claim 1, wherein the transit oven is chosen from the group consisting of linear transit ovens and spiral transit ovens.

4. The production line according to claim 1, wherein the liquid smoke unit is provided with a liquid smoke dispenser.

5. The production line according to claim 1, wherein the food transport path leads through the combined brine/liquid smoke unit.

6. The production line according to claim 1, wherein the production line comprises a UV-source for radiating the food products, which UV-source is located preceding the oven.

7. A production line for in-line processing of extruded food products, comprising a food transport path that successively leads through:
    A) a co-extrusion unit for extruding a food dough into co-extruded food products having a coating that comprises collagen, alginate, and/or hybrid coatings; and subsequently
    B1) a brine unit for feeding a brine solution to the co-extruded food products and subsequently a liquid smoke unit for feeding a liquid smoke to the brined food products, or B2) a combined brine/liquid smoke unit for applying both brine and liquid smoke to the food products; and subsequently C) a transit oven for drying and heating the brined and smoke treated food products;

wherein the transport path is configured such that the brined food products are treated with liquid smoke without pre-drying the brined food products; and wherein the brine unit and the liquid smoke unit, or the combined brine/liquid smoke unit, are provided with a climate controlled cabinet.

8. The production line according to claim 7, wherein the food transport path leads through the combined brine/liquid smoke unit.

* * * * *